United States Patent
Tanaka et al.

(10) Patent No.: US 9,318,057 B2
(45) Date of Patent: Apr. 19, 2016

(54) DISPLAY APPARATUS AND ELECTRONIC APPARATUS

(71) Applicant: Japan Display Inc., Tokyo (JP)

(72) Inventors: Chihiro Tanaka, Tokyo (JP); Toshinori Uehara, Kanagawa (JP)

(73) Assignee: Japan Display Inc., Tokyo (JP)

(*) Notice: Subject to any disclaimer, the term of this patent is extended or adjusted under 35 U.S.C. 154(b) by 274 days.

(21) Appl. No.: 13/789,128

(22) Filed: Mar. 7, 2013

(65) Prior Publication Data

US 2013/0241807 A1   Sep. 19, 2013

(30) Foreign Application Priority Data

Mar. 14, 2012   (JP) .................................. 2012-056701

(51) Int. Cl.
```
G09G 3/34       (2006.01)
G02F 1/1335     (2006.01)
G02B 27/22      (2006.01)
H04N 13/04      (2006.01)
```

(52) U.S. Cl.
CPC .......... *G09G 3/3406* (2013.01); *G02B 27/2214* (2013.01); *G02F 1/133512* (2013.01); *H04N 13/0409* (2013.01); *H04N 13/0422* (2013.01); *G02F 2001/133562* (2013.01)

(58) Field of Classification Search
CPC .......... G09G 3/3406; G02F 1/133512; G02B 27/2214; H04N 13/0409; H04N 13/0422
USPC .............................. 345/32, 102; 359/462, 463
See application file for complete search history.

(56) References Cited

U.S. PATENT DOCUMENTS

| | | | |
|---|---|---|---|
| 2007/0236792 A1 | 10/2007 | Mashitani | |
| 2010/0182686 A1* | 7/2010 | Fukushima | ........ G02B 27/2214 359/463 |
| 2011/0211255 A1 | 9/2011 | Mashitani | |

FOREIGN PATENT DOCUMENTS

| | | | |
|---|---|---|---|
| JP | 2004-212648 | | 7/2004 |
| JP | 2004212648 A | * | 7/2004 |
| JP | 2009-250994 | | 10/2009 |
| JP | 2009250994 A | * | 10/2009 |

(Continued)

OTHER PUBLICATIONS

European Search Report issued Jun. 26, 2013 for corresponding European Appln. No. 13151123.0.

(Continued)

*Primary Examiner* — Amare Mengistu
*Assistant Examiner* — Jennifer Zubajlo
(74) *Attorney, Agent, or Firm* — K&L Gates LLP (57) ABSTRACT

A display apparatus allowing a user positioned in a first direction to visually recognize a first image and allowing a user positioned in a second direction different from the first direction to visually recognize a second image includes: a display unit displaying a combined image formed by combining the first image with the second image; an irradiation unit irradiating the display unit displaying the combined image with irradiation light; a distribution unit distributing components corresponding to the first image of the irradiation light transmitted through the display unit to the first direction and distributing components corresponding to the second image of the irradiation light transmitted through the display unit to the second direction; and a cancellation unit cancelling luminance characteristics of the irradiation light distributed by the distribution unit.

10 Claims, 7 Drawing Sheets

(56) References Cited

FOREIGN PATENT DOCUMENTS

| | | |
|---|---|---|
| JP | 2010-282098 | 12/2010 |
| JP | 2010282098 A * | 12/2010 |

OTHER PUBLICATIONS

Japanese Office Action issued Mar. 3, 2015 in corresponding Japanese Application No. 2012-056701.

* cited by examiner

FIG.1

Prior Art

Prior Art

DISPLAY APPARATUS AND ELECTRONIC APPARATUS

CROSS REFERENCES TO RELATED APPLICATIONS

The present application claims priority to Japanese Priority Patent Application JP 2012-056701 filed in the Japan Patent Office on Mar. 14, 2012, the entire content of which is hereby incorporated by reference.

BACKGROUND

The present disclosure relates to a display apparatus and an electronic apparatus, and particularly relates to a display apparatus and an electronic apparatus suitably applied when different pictures are displayed with respect to plural users positioned in different directions.

For example, there is a car navigation system to be mounted on an automobile which applies a display (hereinafter referred to as a dual-view display) capable of displaying a picture for navigation with respect to a driver driving the automobile in a driver's seat and displaying another picture with respect to a person sitting in a passenger's seat.

Figure 1:
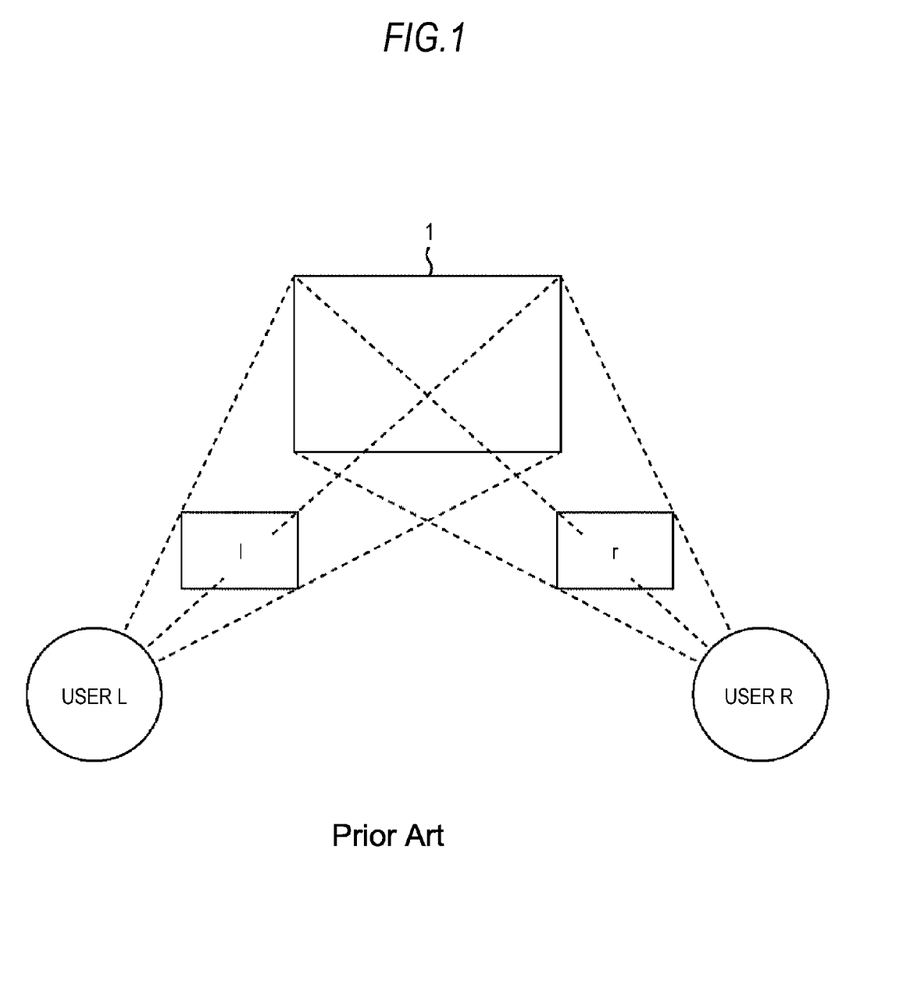
FIG. 1 is a view showing an outline of a dual-view display.

FIG. 1 shows an outline of the dual-view display. A dual-view display 1 can display an image "l" with respect to a user L positioned on the left side facing the dual-view display 1 and can display an image "r" different from the image "l" with respect to a user R positioned on the right side facing the display. Naturally, it is possible to display the same image with respect to the user L and the user R (see JP-A-2005-78092 (Patent Document 1)).

Figure 2:
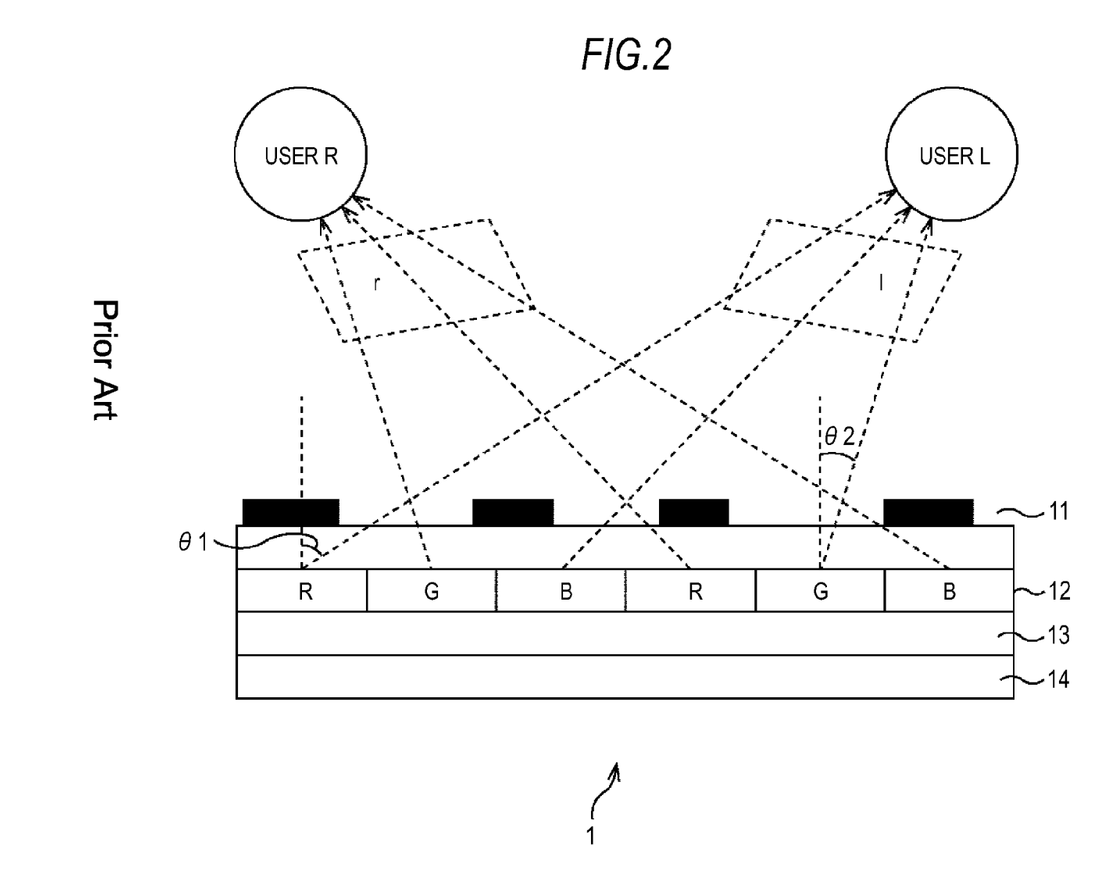
FIG. 2 is a schematic cross-sectional view of a related-art dual-view display.

FIG. 2 shows a schematic cross-sectional view of the dual-view display 1 shown in FIG. 1.

The dual-view display 1 is provided with a parallax barrier 11, a color filter 12, a liquid crystal layer 13 and a backlight 14 sequentially from an upper layer to a lower layer direction. In the drawing, only portions concerning dual-view display are shown, and a polarization plate, electrodes and so on concerning driving of the liquid crystal layer 13 are not shown.

The parallax barrier 11 distributes irradiation light from the lower layer to a direction of the user L or a direction of the user R. The color filter 12 includes color material films of three primary colors R, G and B having a sub-pixel size. The liquid crystal layer 13 displays a combined image in which vertical-direction lines of the image "l" aimed at the user L and the image "r" aimed at the user R are alternately arranged in units of sub-pixels sectioned by R, G and B of the color filter 12. The liquid crystal layer 13 on an upper layer side is uniformly irradiated by the backlight 14.

In the dual-view display 1, the combined image generated by the liquid crystal layer 13 reaches the user L and the user R by the irradiation light from the backlight 14 through the color filter 12 and the parallax barrier 11. Accordingly, the user L can visually recognize the image "l" and the user R can visually recognize the image "r".

SUMMARY

Figure 3:
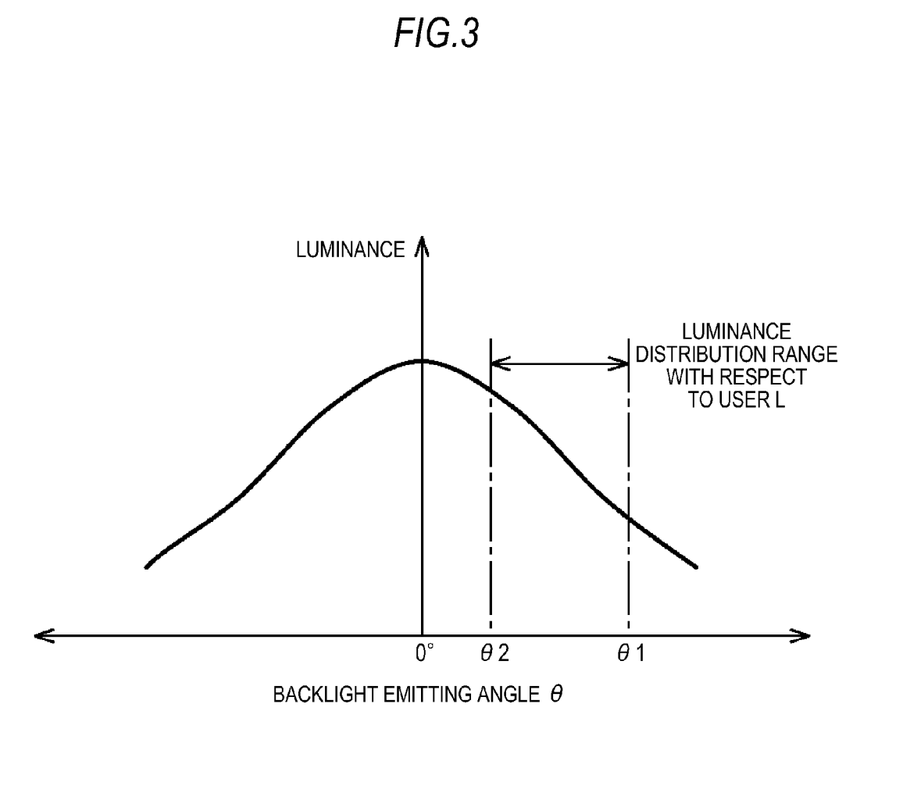
FIG. 3 is a graph showing a surface luminance distribution of a screen seen from a user.

FIG. 3 shows a surface luminance distribution on the dual-view display 1 with respect to the user L.

That is, when an emitted direction of irradiation light at a position farther from the user L is θ1 and an emitted direction of irradiation light at a position closer to the user L is θ2 on the dual-view display 1, the luminance of light is higher (brighter) at the position closer to the user L and the luminance of light is lower (darker) at the position farther from the user L. The surface luminance distribution on the dual-view display 1 with respect to the user R is the same as the above. Accordingly, it is difficult for the users to view a screen of the dual-view display 1 in a good condition.

Thus, a mechanism for allowing the surface luminance distribution on the screen of the dual-view display 1 viewed by the user to be uniform is necessary.

In view of the above, it is desirable to allow the surface luminance distribution on the screen visually recognized by the user to be uniform.

An embodiment of the present disclosure is directed to a display apparatus allowing a user positioned in a first direction to visually recognize a first image and allowing a user positioned in a second direction different from the first direction to visually recognize a second image, which includes a display unit displaying a combined image formed by combining the first image with the second image, an irradiation unit irradiating the display unit displaying the combined image with irradiation light, a distribution unit distributing components corresponding to the first image of the irradiation light transmitted through the display unit to the first direction and distributing components corresponding to the second image of the irradiation light transmitted through the display unit to the second direction, and a cancellation unit cancelling luminance characteristics of the irradiation light distributed by the distribution unit.

The cancellation unit may include an open-area ratio correction unit in which an open area ratio of an optical filter transmitting the irradiation light transmitted through the display unit is adjusted in accordance with coordinates.

The optical filter may be a color filter, and the open-area ratio correction unit may be a black matrix.

The black matrix may adjust the open-area ratio in units of sub-pixels or in units of pixels of the color filter in accordance with coordinates.

The cancellation unit may further include a luminance correction unit correcting a luminance signal of the combined image so as to cancel luminance characteristics of the irradiation light distributed by the distribution unit.

The cancellation unit may further include a color filter transmitting the irradiation light transmitted through the display unit, in which at least one of a film thickness and density is adjusted in accordance with coordinates.

The cancellation unit may further include an irradiation control unit controlling the irradiation unit so as to cancel luminance characteristics of the irradiation light distributed by the distribution unit.

In the embodiment of the present disclosure, components corresponding to the first image of the irradiation light transmitted through the display unit displaying the combined image are distributed to the first direction and components corresponding to the second image are distributed to the second direction. Then, luminance characteristics of the irradiation light to be distributed are cancelled.

Another embodiment of the present disclosure is directed to an electronic apparatus allowing a user positioned in a first direction to visually recognize a first image and allowing a user positioned in a second direction different from the first direction to visually recognize a second image, which includes an image combining unit combining the first image with the second image to generate a combined image, a display unit displaying the combined image, an irradiation unit irradiating the display unit displaying the combined image with irradiation light, a distribution unit distributing components corresponding to the first image of the irradiation light transmitted through the display unit to the first direction and distributing components corresponding to the second image of the irradiation light transmitted through the display unit to the second direction, and a cancellation unit cancelling luminance characteristics of the irradiation light distributed by the distribution unit.

In another embodiment of the present disclosure, the first image is combined with the second image to generate the combined image, components corresponding to the first image of the irradiation light transmitted through the display unit displaying the combined image are distributed to the first direction and components corresponding to the second image are distributed to the second direction. Then, luminance characteristics of the irradiation light to be distributed are cancelled.

According to the embodiment of the present disclosure, the surface luminance distribution on the screen visually recognized from both sides can be uniform.

According to another embodiment of the present disclosure, surface luminance distributions on different screens visually recognized by plural users respectively positioned in the right and left directions of the screen.

Additional features and advantages are described herein, and will be apparent from the following Detailed Description and the figures.

DETAILED DESCRIPTION

Hereinafter, modes for carrying out the present disclosure (hereinafter referred to as an embodiment) will be explained in detail with reference to the drawings.

[Structure Example of Display Apparatus]

Figure 4:
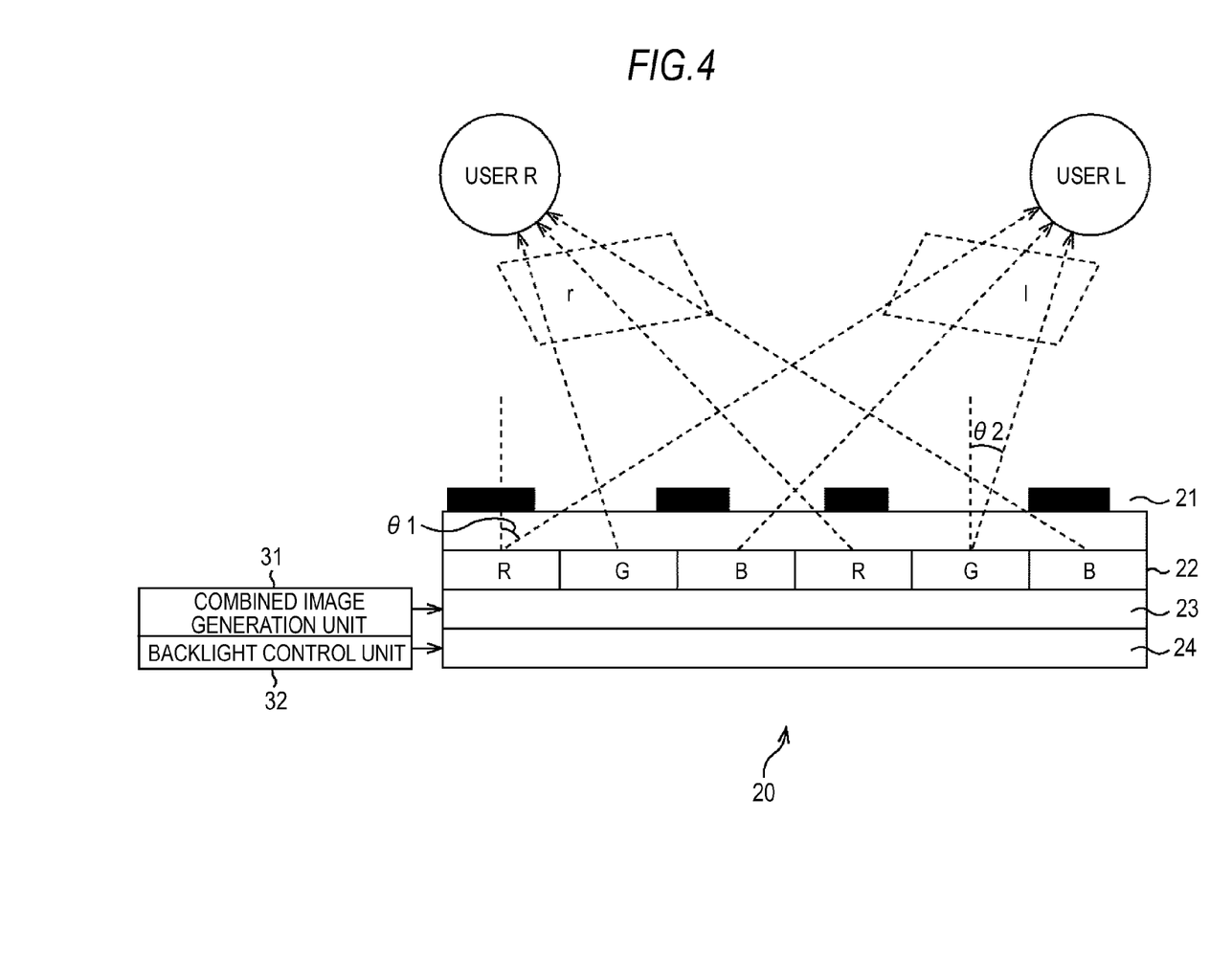
FIG. 4 is a schematic cross-sectional view of a display apparatus to which an embodiment of the present disclosure is applied.

FIG. 4 shows a schematic cross-sectional view of a display apparatus 20 according to the embodiment of the present disclosure.

The display apparatus 20 is applied to, for example, a car navigation system, a game machine and so on, displaying an image "l" with respect to a user L positioned on the left side facing the display apparatus 20, and displaying an image "r" which is different from the image "l" with respect to a user R positioned on the right side facing the display apparatus 20. Naturally, it is possible to display the same image with respect to the user L and the user R.

The display apparatus 20 is provided with a parallax barrier 21, a color filter with BM (black matrix) 22, a liquid crystal layer 23 and a backlight 24 sequentially from an upper layer to a lower layer direction. The display apparatus 20 is also provided with a combined image generation unit 31 and a backlight control unit 32.

In the schematic cross-sectional view of the drawing, only portions concerning dual-view display are shown, and a polarization plate, electrodes and so on concerning driving of the liquid crystal layer 23 are not shown.

The parallax barrier 21 distributes irradiation light from the lower layer to a direction of the user L or a direction of the user R. It is also preferable to use a lenticular lens instead of the parallax barrier 21.

The color filter with BM 22 includes color material films of three primary colors R, G and B having a sub-pixel size, in which an open area ratio is adjusted in accordance with a coordinate position by changing the size in a black matrix provided on the surface of them (the details will be explained later with reference to FIGS. 5A to 5D).

The liquid crystal layer 23 displays a combined image in which vertical-direction lines of the image "l" aimed at the user L and the image "r" aimed at the user R alternately appear in units of sub-pixels sectioned by R, G and B of the color filter with BM 22 based on a corrected signal of the combined image to be inputted from the combined image generation unit 31. The liquid crystal layer 23 on an upper layer side is uniformly irradiated by the backlight 24 in accordance with control by the backlight control unit 32.

The combined image generation unit 31 generates the signal of the combined image by alternately arranging vertical-direction lines of an image signal of the image "l" and an image signal of the image "r" inputted from the previous stage in units of sub-pixels sectioned by R, G and B of the color filter with BM 22.

The backlight control unit 32 control the backlight 24 to allow the liquid crystal layer 23 on the upper layer side to be irradiated. Irradiation characteristics by the backlight 24 are the same as shown in FIG. 3.

[First Structure Example of Color Filter with BM 22]

Figures 5A, 5B:
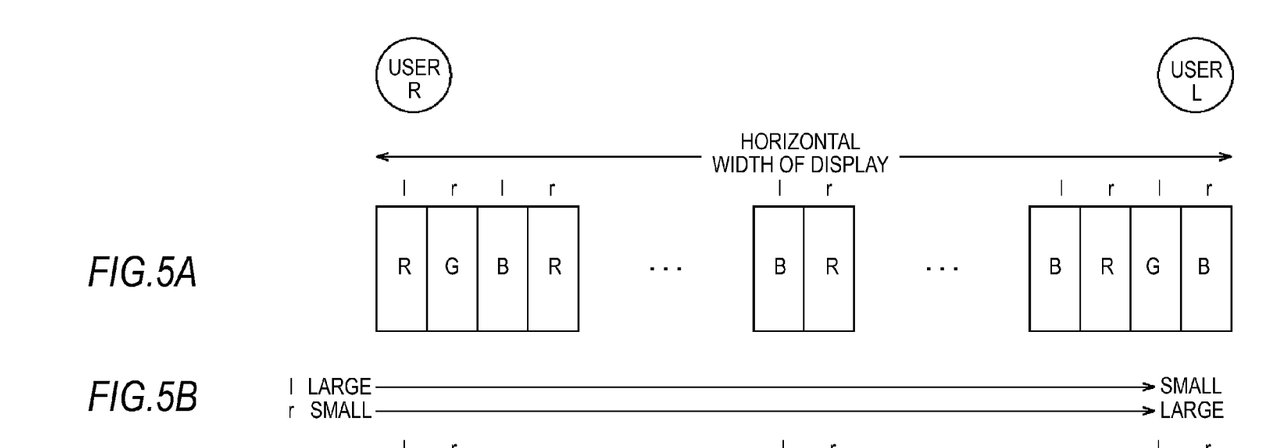
FIGS. 5A to 5D are views showing a first structure example of a black matrix of a color filter.

FIGS. 5A to 5D show a first structure example of the black matrix in the color filter with BM 22. FIGS. 5A to 5D correspond to a case where the combined image displayed on the liquid crystal layer 23 is configured by vertical-direction lines of the image "l" and the image "r" alternately arranged in units of sub-pixels as shown in FIG. 5A.

As shown in FIG. 5B, concerning the BM for transmitting the image "l" aimed at the user L, the size of areas not covered with the BM (white areas surrounded by an black area in which any of R, G and B is written in the drawings) is changed so that an open area ratio of the BM is gradually reduced from a position farther from the user L to a position closer to the user L. Similarly, concerning the BM for transmitting the image "r" aimed at the user R, the size of areas not masked by the BM is changed so that the open area ratio is gradually increased from a position closer to the user R to a position farther from the user R.

Specifically, there is a method of changing a vertical size or a horizontal size of the areas not covered with the BM.

Figure 5C:
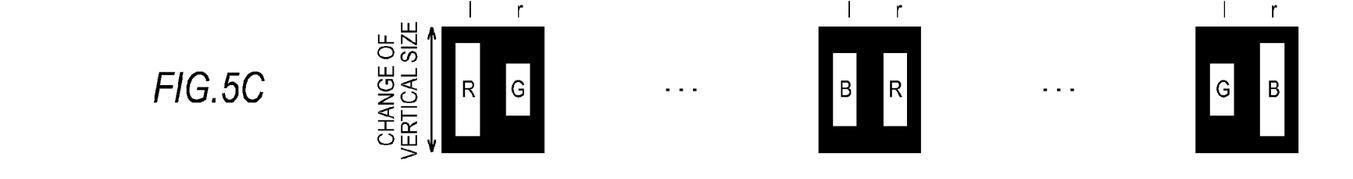
Figure 5D:
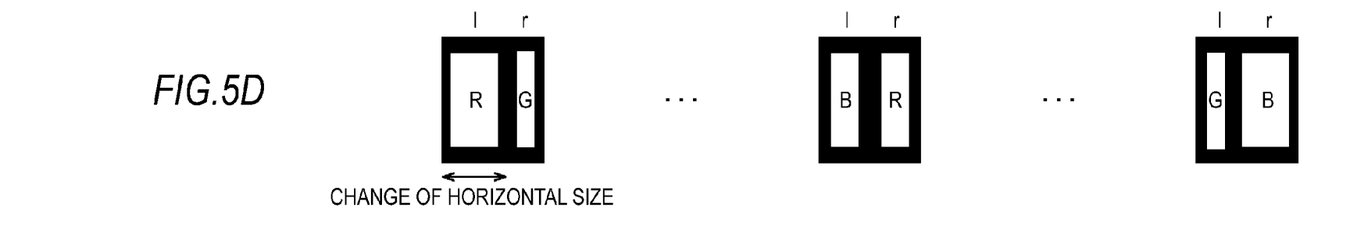

FIG. 5C shows a case where the vertical size of the areas not covered with the BM is changed without changing the horizontal size of the areas. FIG. 5D shows a case where the horizontal size of the areas not covered with the BM is changed without changing the vertical size of the areas. When comparing the case of FIG. 5D with the case of FIG. 5C in the same coordinates, the open area ratio can be further increased in the case of FIG. 5D. However, in the case of FIG. 5D, the adjustment of the parallax barrier 21 will be necessary.

As shown in FIG. 5C or FIG. 5D, it is possible to increase the open area ratio at the position farther from the user and to reduce the open area ratio at the position closer to the user by changing the size of the areas not covered with the BM, therefore, the surface luminance distribution on the screen seen by the user can be corrected to be uniform.

Incidentally, the display apparatus 20 shown in FIG. 4 and the color filter with BM 22 shown in FIGS. 5A to 5D correspond to the case where the combined image displayed on the liquid crystal layer 23 is configured by the vertical-direction lines of the image "l" and the image "r" alternately arranged in units of sub-pixels. The present disclosure can be also applied to a case where the combined image is configured by the vertical-direction lines of the image "l" and the image "r" alternately arranged in units of pixels each having three sub-pixels of R, G and B. In such case, the position of the parallax barrier 21 differs from the case shown in FIG. 4.

[Second Structure Example of Color Filter with BM 22]

Figures 6A, 6B:
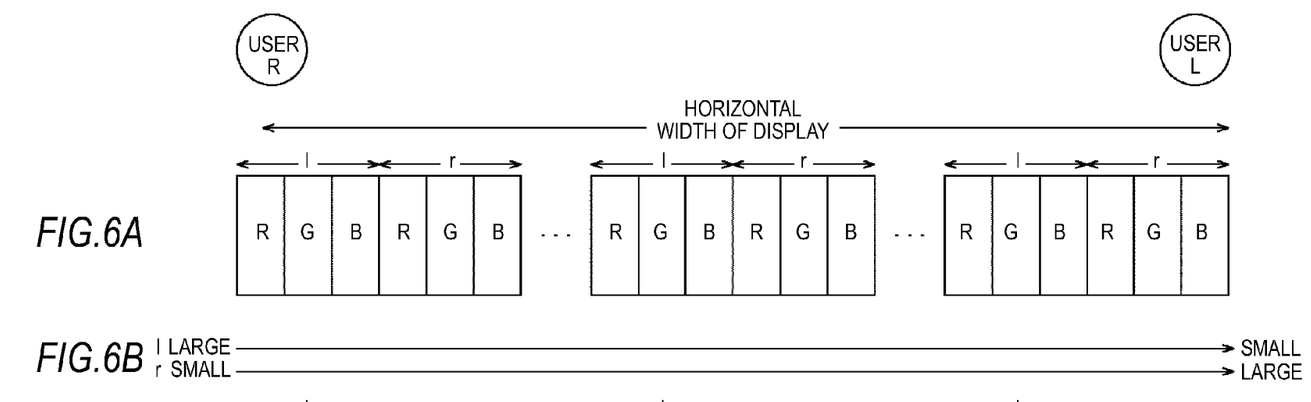
FIGS. 6A to 6D are views showing a second structure example of the black matrix of the color filter.

FIGS. 6A to 6D show a second structure example of the black matrix of the color filter with BM 22. FIGS. 6A to 6D correspond to a case where the combined image displayed on the liquid crystal layer 23 is configured by vertical-direction lines of the image "l" and the image "r" alternately arranged in units of pixels each having three sub-pixels of R, G and B as shown in FIG. 6A.

As shown in FIG. 6B, concerning the BM for transmitting the image "l" aimed at the user L, the size of areas not covered with the BM is changed so that the open area ratio of the BM is gradually reduced from a position farther from the user L to a position closer to the user L. Similarly, concerning the BM for transmitting the image "r" aimed at the user R, the size of areas not masked by the BM is changed so that the open area ratio is gradually increased from a position closer to the user R to a position farther from the user R.

Figure 6C:
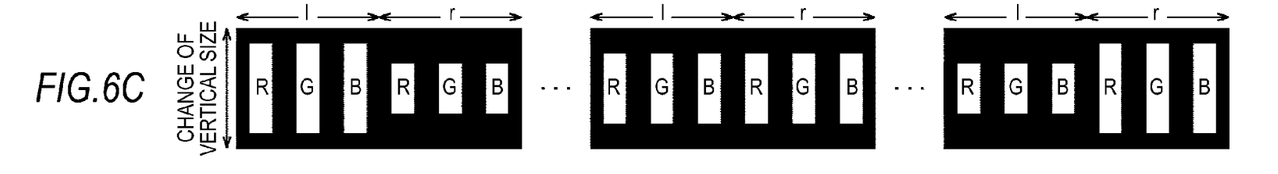
Figure 6D:
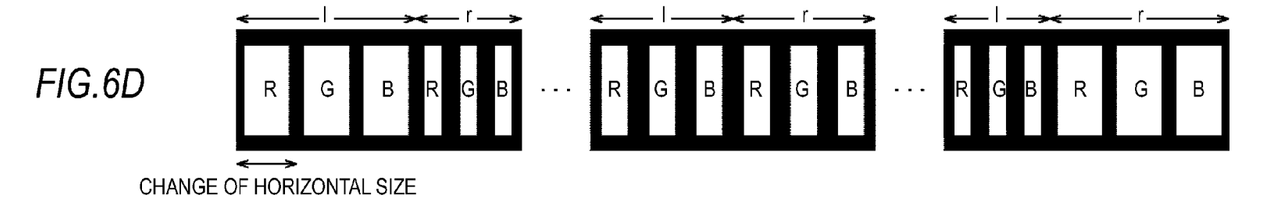

FIG. 6C shows a case where the vertical size of the areas not covered with the BM is changed without changing the horizontal size of the areas. FIG. 6D shows a case where the horizontal size of the areas not covered with the BM is changed without changing the vertical size of the areas. When comparing the case of FIG. 6D with the case of FIG. 6C in the same coordinates, the open area ratio can be further increased in the case of FIG. 6D.

As explained above, characteristics in which the luminance of light is higher (brighter) at a position closer to the user and the luminance of light is lower (darker) at a position farther from the user shown in FIG. 3 can be cancelled by gradually changing the open area ratio of the BM in the color filter with BM 22.

Modification Example

It is also possible to correct an image signal of the combined image in addition to changing the open area ratio of the BM in the color filter with BM 22 as described above.

That is, the combined image generation unit 31 corrects the image signal of the image "l" inputted from the previous stage so that the luminance of pixels at coordinates farther from the user L becomes higher and the luminance of pixels at coordinates closer to the user L becomes lower. Similarly, the combined image generation unit 31 may correct the image signal of the image "r" inputted from the previous stage so that the luminance of pixels at coordinates farther from the user R becomes higher and the luminance of pixels at coordinates closer to the user R becomes lower.

It is also preferable to adjust the transmittance of irradiation light by changing the film thickness or density of color material films in the color filter with BM 22.

Figure 7:
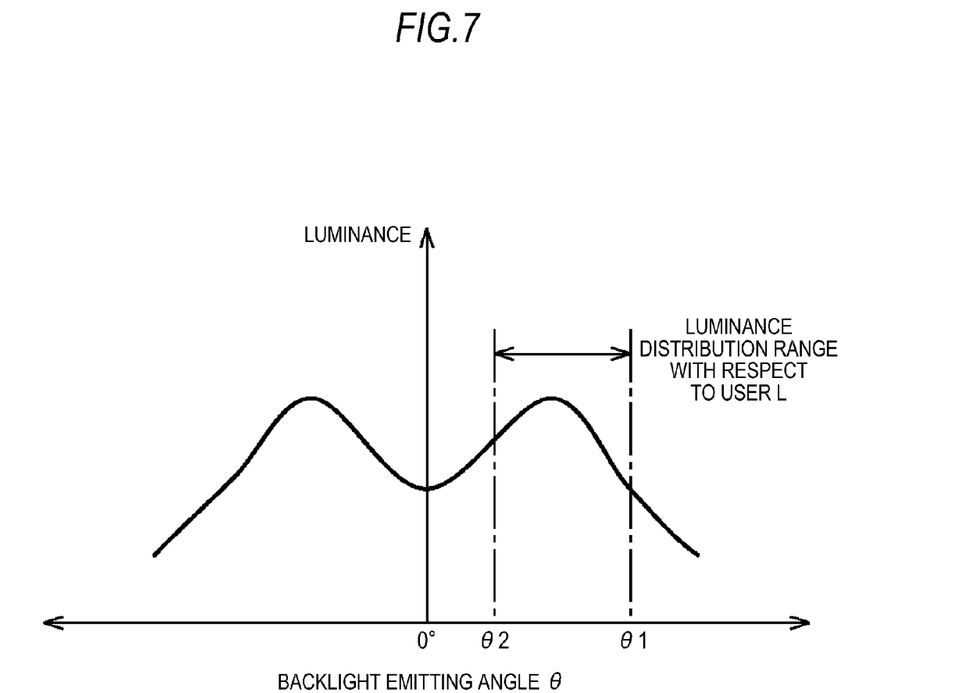
FIG. 7 is a view showing an adjustment example of the surface luminance distribution on the screen seen from the user.

It is also possible to specialize irradiation characteristics of the backlight 24 for the purpose of dual-view display, for example, so as to have two peaks as shown in FIG. 7. In this case, the open area ratio in the BM for transmitting the image "l" aimed at the user L is gradually changed in the order of large, small and large, not gradually reducing the open area ratio from the position farther from the user L to the position closer to the user L. Similarly, the open area ratio in the BM for transmitting the image "r" aimed at the user R is gradually changed in the order of small, large and small, not gradually increasing the open area ratio from the position closer to the user R to the position farther from the user R.

As described above, in the display apparatus 20 according to the embodiment of the present disclosure, it is possible to allow the surface luminance distribution of the image "l" visually recognized by the user L positioned on the left side facing the display apparatus 20 to be uniform as well as to allow the surface luminance distribution of the image "r" visually recognized by the user R positioned on the right side facing the display apparatus 20 to be uniform.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus allowing a first user positioned in a first direction to visually recognize a first image and allowing a second user positioned in a second direction different from the first direction to visually recognize a second image, comprising:
   a display unit displaying a combined image formed by combining the first image with the second image;
   an irradiation unit irradiating the display unit displaying the combined image with irradiation light;
   a distribution unit distributing components corresponding to the first image of the irradiation light transmitted through the display unit to the first direction and distributing components corresponding to the second image of the irradiation light transmitted through the display unit to the second direction; and
   a cancellation unit cancelling luminance characteristics of the irradiation light distributed by the distribution unit,
   wherein the cancellation unit includes an open-area ratio correction unit including an optical filter including first and second open areas configured to transmit the irradiation light transmitted through the display unit,
   wherein sizes of at least the first open areas are gradually reduced in a parallax direction.

2. The display apparatus according to claim 1,
   wherein the optical filter is a color filter, and
   the open-area ratio correction unit is a black matrix.

3. The display apparatus according to claim 2,
   wherein the sizes of the first open areas of the black matrix are reduced in units of sub-pixels or in units of pixels of the color filter in accordance with coordinates in the parallax direction.

4. The display apparatus according to claim 1,
   wherein the cancellation unit further includes
      a luminance correction unit correcting image signals of the first and second images so that luminance of pixels for the first image at coordinates farther from the first user becomes higher and the luminance of pixels for the first image at coordinates closer to the first user becomes lower and so that luminance of pixels for the second image at coordinates farther from the second user becomes higher and the luminance of pixels for the second image at coordinates closer to the second user becomes lower.

5. The display apparatus according to claim 4,
wherein the cancellation unit further includes
a color filter transmitting the irradiation light transmitted through the display unit, in which at least one of a film thickness and density is adjusted in accordance with coordinates.

6. The display apparatus according to claim 1,
wherein the cancellation unit further includes
an irradiation control unit controlling the irradiation unit so as to cancel luminance characteristics of the irradiation light distributed by the distribution unit.

7. The display apparatus according to claim 1,
wherein sizes of the first open areas are gradually reduced in the parallax direction, and sizes of the second open areas are gradually increased in a direction that is opposite to the parallax direction.

8. An electronic apparatus allowing a first user positioned in a first direction to visually recognize a first image and allowing a second user positioned in a second direction different from the first direction to visually recognize a second image, comprising:
an image combining unit combining the first image with the second image to generate a combined image;
a display unit displaying the combined image;
an irradiation unit irradiating the display unit displaying the combined image with irradiation light;
a distribution unit distributing components corresponding to the first image of the irradiation light transmitted through the display unit to the first direction and distributing components corresponding to the second image of the irradiation light transmitted through the display unit to the second direction; and
a cancellation unit cancelling luminance characteristics of the irradiation light distributed by the distribution unit,
wherein the cancellation unit includes an open-area ratio correction unit including an optical filter including first and second open areas configured to transmit the irradiation light transmitted through the display unit,
wherein sizes of at least the first open areas are gradually reduced in a parallax direction.

9. The electronic apparatus according to claim 8,
wherein the cancellation unit further includes a luminance correction unit correcting image signals of the first and second images so that luminance of pixels for the first image at coordinates farther from the first user becomes higher and the luminance of pixels for the first image at coordinates closer to the first user becomes lower and so that luminance of pixels for the second image at coordinates farther from the second user becomes higher and the luminance of pixels for the second image at coordinates closer to the second user becomes lower.

10. The electronic apparatus according to claim 8,
wherein sizes of the first open areas are gradually reduced in the parallax direction, and sizes of the second open areas are gradually increased in a direction that is opposite to the parallax direction.

* * * * *